United States Patent
Balmes, Sr.

[15] 3,675,722
[45] July 11, 1972

[54] PRESSURE INDICATOR

[72] Inventor: Mark E. Balmes, Sr., Chamblee, Ga.
[73] Assignee: General Fire Extinguisher Corporation, Northbrook, Ill.
[22] Filed: April 5, 1971
[21] Appl. No.: 131,162

Related U.S. Application Data

[63] Continuation of Ser. No. 794,866, Jan. 29, 1969, abandoned.

[52] U.S. Cl.....................................169/30, 73/406, 116/70, 222/23, 239/74
[51] Int. Cl. .........................A62c 11/00, G01i 19/12
[58] Field of Search............169/30, 31 R, 31 P; 239/71, 239/74; 73/388, 406; 116/34, 70, 117; 222/23

[56] References Cited

UNITED STATES PATENTS

| | | | |
|---|---|---|---|
| 3,068,832 | 12/1962 | Washburn | 116/117 |
| 3,088,522 | 5/1963 | Zellner | 169/31 |
| 3,134,445 | 5/1964 | Hotchkiss | 116/70 X |
| 3,241,514 | 3/1966 | Grimland | 116/70 |
| 3,372,501 | 3/1968 | Greene | 116/70 X |

Primary Examiner—M. Henson Wood, Jr.
Assistant Examiner—Michael Y. Mar
Attorney—Axel A. Hofgren et al.

[57] ABSTRACT

An inexpensive and yet highly reliable device for indicating when the pressure in a receptacle is above or below a predetermined value comprises a housing means, a diaphragm means in the housing means, the diaphragm means having first and second side surfaces and a translucent viewing means having an inner surface, at least a portion of which is adjacent to the second surface of the diaphragm means. The first side surface of the diaphragm is adapted to be in pressure communication with the receptacle so the the diaphragm means may be movable between a first position in which the pressure is below a predetermined value and a second position in which the pressure is above a predetermined value. The inner surface of the viewing is relatively frosted except for at least one portion or area which is relatively clear so that when the diaphragm is in the second position it will be in contact with the inner surface of the viewing means and obscure the differences between the relatively frosted portion and the relatively clear portion. With the diaphragm in the second position the second surface of the diaphragm will be clearly visible through the viewing means and hence indicia on the second surface may be easily read. In one embodiment the word "full" may be used. In the first position with the second surface out of contact with the inner surface of the viewing means the relatively clear area will be readily distinguishable from the relatively frosted area. If the relatively clear area forms the word "empty" this may be clearly read.

15 Claims, 5 Drawing Figures

PATENTED JUL 11 1972
3,675,722
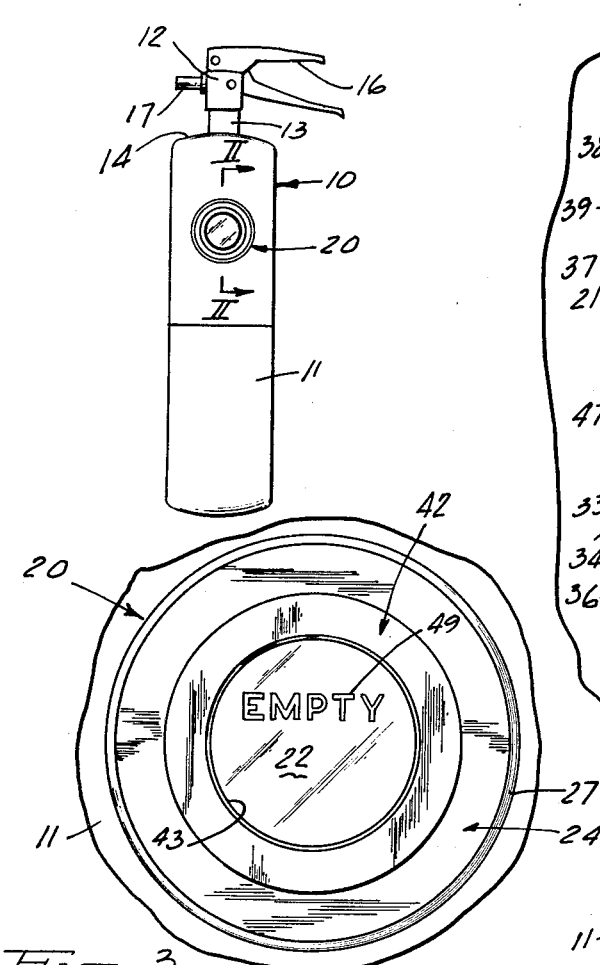
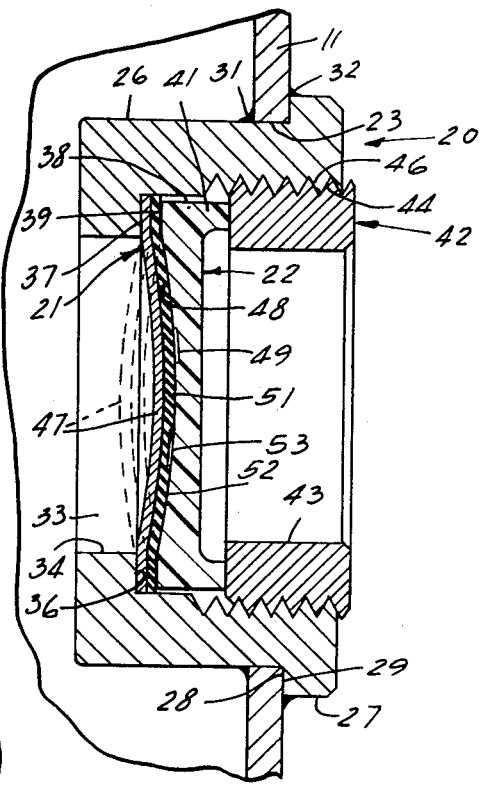
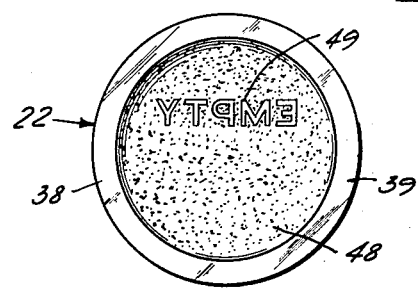
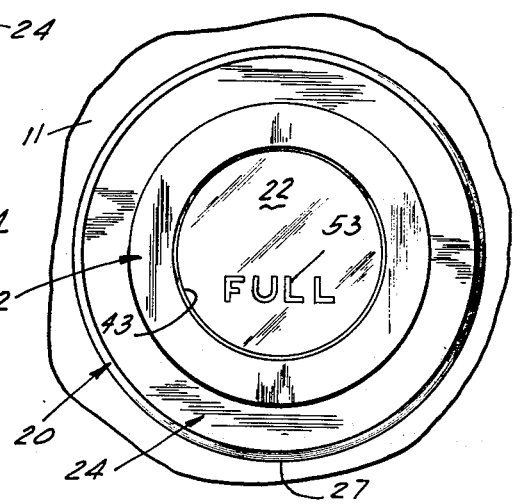
INVENTOR.
MARK E. BALMES, SR.
BY *Hill, Sherman, Meroni, Gross & Simpson* ATTORNEYS

PRESSURE INDICATOR

CROSS-REFERENCE TO RELATED APPLICATION

This application is a continuation of application, Ser. No. 794,866, filed Jan. 29, 1969 now abandoned.

BACKGROUND OF THE INVENTION

1. Field of the Invention

This invention generally relates to pressure indicators, and more particularly refers to a device for visibly indicating a pressure in a receptacle means which is above or below a predetermined value.

2. Description of the Prior Art

Means for indicating the pressure of fluids and materials within a receptacle are, of course, well known in the prior art. Thus, the prior art includes devices for indicating a specific pressure over a given range or for indicating that a pressure is above or below a preselected value. Most of these require special seals, valving, etc. and are relatively complicated and expensive to manufacture. Certain applications of pressure indicating devices however merely require indication of whether a pressure within a vessel is above or below a preselected value. One such application of a pressure indicator may be found in the fire extinguisher art, and particularly with reference to fire extinguishers utilizing pressurized chemical fire extinguishing materials wherein it is important for safety purposes to have an indication of whether the material contained within the fire extinguisher is at a sufficient pressure to be effectively discharged in the time of need. Heretofore, to my knowledge, fire extinguishers of the pressurized chemical type have usually been equipped with a relatively expensive and complicated standard bourdon tube-type pressure indicator having a needle which rotates to indicate the condition on a dial divided into appropriate ranges as, for example, "Full" and "Empty" or "Discharged", "Operable" and "Overcharged".

There has therefore existed a need for a much less expensive and yet highly reliable pressure indicating means. This need has gone unrecognized and/or unfilled with the result that costs of fire extinguishers have been higher than they have had to be. As a result perhaps many who would have bought fire extinguishers have not done so and may have suffered an otherwise avoidable detriment due to fire.

SUMMARY OF THE INVENTION

A pressure indicator constructed in accordance with the principles of the present invention generally includes a diaphragm means such as an oil-canning disc. Such diaphragm or disc of flexible material may have a centrally disposed, domed portion movable from a first or what may be called its free or normal, convex position, to a second or concave position in response to an increase in pressure above a preselected value applied to a first side thereof or inwardly of the domed portion in the normal convex position, and a translucent viewing means or window member having an inner surface juxtaposed relative to the diaphragm means and formed with a configuration complementary to the domed portion. The dished surface of the translucent window is frosted except for at least one portion which is relatively clean or transparent.

The diaphragm means and the viewing means are retained within an appropriately formed housing which may be sealed into an aperture formed in a side wall of a pressure vessel. Also, the pressure indicator housing may include an appropriately formed coupling member engaging a fitting formed on the pressure vessel. In either case, a first side surface of the diaphragm means disposed oppositely of the translucent window is in fluid communication with an interior of the pressure receptacle in a manner to permit the pressure of the fluid contained within the receptacle to act upon the diaphragm means.

When a pressure indicator constructed in accordance with the principles of the present invention is utilized to indicate an amount of pressure contained within a fire extinguisher, the diaphragm means may be designed so that the centrally disposed domed portion moves from the first position to the second position whenever the pressure within the fire extinguisher exceeds a pressure which results when the extinguisher contains a sufficient amount of pressurized fire extinguishing material to properly function. Also, the diaphragm means should be designed to return to the normal convex position in response to a decrease in pressure resulting from the fire extinguishing material being sufficiently discharged to render the extinguisher inoperable. In one embodiment, the diaphragm means moves into tight engagement with the frosted inner surface of the translucent viewing means whenever the fire extinguisher is under full operating pressure and hence the indicia "FULL" will be readily distinguishable to one viewing the device.

With the diaphragm in tight engagement with the partially frosted surface of the translucent window, visible distinctions between the clear and frosted areas are obliterated and the window presents a uniformly appearing character. Also, with the diaphragm out of engagement with the partially frosted surface, the surface of the diaphragm becomes visible through the clear areas and the frosted areas appear clear. In this manner, a pressure indicator constructed in accordance with the principles of the present invention provides means for readily ascertaining whether pressure within a vessel is above or below a preselected value.

When applied to a fire extinguisher, the clear areas formed on the partially frosted surface may be configured to indicate a word, for example, "EMPTY". Furthermore, indented portions formed on the surface of the oil-canning disc will be visible through the frosted areas whenever the oil-canning disc is in tight engagement with the domed, partially frosted surface of the translucent window, and therefore, the oil-canning disc may include indentations forming a word, for example, "FULL", formed either directly on the oil-canning disc or on a flexible member adhered to the disc.

Accordingly, it is a primary object of the present invention to provide a device for indicating pressure above or below a preselected value and including a disc member movable into and out of engagement with a partially frosted surface of a translucent window member in response to an increase or decrease in pressure above or below the preselected value.

BRIEF DESCRIPTION O0 THE DRAWINGS

In the accompanying drawings forming a part of this specification and in which like reference characters are employed to designate like parts throughout the same:

FIG. 1 is a side elevational view of a fire extinguisher incorporating a pressure indicator constructed in accordance with the features of the present invention;

FIG. 2 is a sectional view taken along line II–II of FIG. 1;

FIGS. 3 and 4 are enlarged elevational views of the present indicator of FIGS. 1 and 2 respectively illustrating outward appearances of the indicator when a movable disc is in tight engagement and out of engagement with a partially frosted surface of a translucent window; and FIG. 5 is an enlarged view of a translucent window utilized in the present invention illustrating a partially frosted surface thereof.

DESCRIPTION OF THE PREFERRED EMBODIMENT

Referring to the drawing, there is shown a fire extinguisher generally indicated at 10 and including a cylinder 11 containing a pressurized fire extinguishing material and an outlet control valve 12. The cylinder 11 may be constructed of two halves telescoped together and sealed by brazing or other suitable sealing means. The outlet valve 12 threadingly engages an appropriately formed fitting 13 brazed or otherwise sealed into an aperture formed in an upper domed wall 14 of the cylinder 11. The outlet control valve 12 has a manually operable actuating handle 16 by means of which the supply of fire extinguishing material within the cylinder 11 may be selectively released. Accordingly, when open, the outlet valve 12 will permit the pressurized fire extinguishing material to discharge through an outlet orifice 17.

Fire extinguishers, such as the type shown generally at 10, usually include a device for indicating the amount of pressurized fire extinguishing material contained within the cylinder 11, and since the pressure within the receptacle or cylinder 11 is generally proportional to the amount of material contained therein, a pressure indicator may be utilized for this purpose. Accordingly, the fire extinguisher 10 may include a pressure indicator generally designated at 20 and sealed within an appropriately formed aperture in a side wall of the cylinder 11.

In accordance with the principles of the present invention, the pressure indicator 20, as illustrated in detail in FIGS. 2 through 5, may include a diaphragm means or disc 21 and a translucent viewing means or window 22. The cylinder 11 has a circular aperture 23 formed therein for receiving the pressure indicator 20. A housing 24 has a cylindrical portion 26 sized to tightly engage the aperture 23 and also has an enlarged cylindrical portion 27 forming an annular shoulder 28 which engages an outer surface as at 29 of the cylinder 11. The housing 24 is sealed into the aperture 23 by beads of brazing material as at 31 and 32, or other suitable sealing means.

The housing 24 has a centrally disposed throughbore 33 characterized by a reduced portion 34 forming an interior annular shoulder 36. The diaphragm 21 has an annular peripheral portion as at 37 seated against the shoulder 36 and sized to snugly fit within the throughbore 33. Also, the translucent window means 22 includes a cylindrical rim portion 38 sized to fit within the throughbore 33. The rim portion 38 forms a planar, annular surface 39 seated against the annular portion 37 of the disc 21 on a side thereof opposite the shoulder 36. Also, the rim portion 38 of the translucent member 22 is characterized by a generally axially extending, annular projection 41 engaged by a retaining ring 42 in a manner to squeeze the translucent window 22 and the disc 21 between the retaining ring and the shoulder 36 of the housing 24 for maintaining the various elements of the pressure indicator 20 in an assembled relationship.

The retaining ring 42 has a centrally disposed throughbore 43 aligned with the translucent window 22 to permit substantially the entire window to be visible therethrough. Also, the retaining ring 42 has external threads as at 42 formed on an outer periphery thereof engaging complementary internal threads as at 46 formed on an outermost end portion of the bore 33 of the housing 24. Although the housing 24 and the retaining ring 42, as illustrated in FIG. 2, includes threaded means 44 and 46 for retaining the ring within the housing, the retaining ring may be secured within the housing by other suitable means, for example, by staking.

It is contemplated by the present invention that the diaphragm means 21 may have a first and second side surface. In one embodiment it is an oil-canning disc, i.e. a disc having a centrally disposed, domed portion 47. The diaphragm means 21 is movable from a first or convex position which it will assume with pressure below a predetermined value (as illustrated by dash lines in FIG. 2) to a second, or concave position (as illustrated by solid lines in FIG. 2) in response to a pressure above a preselected value applied to the first side or inwardly of the domed portion in the normal convex position. Whenever pressure forces on the first side surface or domed portion 47 decrease below the preselected value, which value depends upon the flexibility and thickness of the selected material and the curvature of the dome, the domed portion will abruptly move to the first or normal convex position. This flexing movement is characteristic of the bottom wall portion of an oil dispensing can, and thus, the term "oil-canning" disc.

When the pressure indicator 20 is utilized to indicate the pressure and the effective amount of pressurized fire extinguishing material contained within a fire extinguisher, such as 10, the oil-canning disc 21 may be configured to move from the normal convex position, shown by dash lines, to the concave position, when a sufficient amount of pressurized fire extinguishing material is contained within the cylinder 11 to render the extinguisher 10 operable. Since the pressure within the cylinder 11 changes proportionally to the amount of pressurized fire extinguishing material contained therewithin, the disc 21 in effect moves in response to the pressure within the cylinder 11. Accordingly, the preselected pressure required to move the domed portion 47 from the normal convex position to the concave position is determined by the pressure resulting from a minimum amount of pressurized fire extinguishing material which renders the extinguisher 10 operable.

Also, in accordance with the principles of the present invention, the translucent window 22 has a surface 48 formed with a dished configuration complementary to the configuration of the domed portion 47 of the disc 21 and positioned juxtapositionally to the disc. The domed surface 48 is partially frosted to provide both frosted areas and clear areas, generally designated at 49 and illustrated as at indentation for clarity. Whenever a surface is tightly engaged with the partially frosted surface 48, visible distinction between the frosted and clear areas is obliterated when the translucent window 22 is viewed from a side opposite the frosted surface.

Accordingly, whenever the amount of pressurized fire extinguishing material contained within the cylinder 11 generates a pressure greater than the preselected pressure causing the dome portion 47 of the disc 21 to move into tight engagement with the partially frosted dished surface 48, the clear areas 49 become visibly indistinct from the frosted areas and the window 22 presents a uniformly appearing character. On the other hand, whenever the domed portion 47 of the disc 21 is out of engagement with the partially frosted surface 48 due to the pressure within the cylinder 11 being below the preselected value, the frosted areas appear white and the clear areas 49 transmit light reflected from the disc 21, and thus, are distinctly visible.

When the pressure indicator 20 is utilized to indicate the amount of pressurized fire extinguishing material contained within a fire extinguisher such as 10, the clear areas 49 may be formed in a manner to spell the word "EMPTY", as illustrated in FIG. 5, and thereby to provide a positive visual indication of a discharged state or inoperability of the fire extinguisher 10.

Also, in accordance with the principles of the present invention, a novel means is provided for indicating a charged or operable condition of the fire extinguisher. This indicating means includes a sheet formed member 51 adhered to an outermost side surface of the disc 21 to be juxtapositionally related to the translucent window 22. The sheet formed member 51 has a size and a configuration to be coextensive with the disc 21 and to move with the domed portion 47. An outermost side surface 52 of the flexible member 51 contains indentations as at 53 which may form the word "FULL". Desirably, the indentations 53 are differently colored relative to the remainder of the surface 52 and horizontally spaced from the clear areas 49 of the partially frosted surface 48.

Accordingly, whenever the pressure within the cylinder 11 exceeds the preselected value to cause the domed portion 47 to move to the concave position, the surface 52 of the flexible member 51 tightly engages the dished, partially frosted surface 48 of the translucent window 22. The indentations 53 form an air space permitting light to be reflected from the differently colored indentations, and thus, the indentations are clearly visible through the frosted areas of the translucent window 22, as illustrated in FIG. 4. As described hereinabove, tight engagement between the surface 52 of the flexible member 51 and the partially frosted dished surface 48 of the translucent window 22 renders the clear areas 49 visibly indistinct, and therefore, only the indentations forming the word "FULL" are visible.

The housing 24 may have a configuration permitting threaded engagement with a threaded aperture formed within the cylinder or within a fitting attached to the cylinder in a manner to provide fluid communication between an interior of the cylinder and a side surface of the oil-canning disc opposite of the translucent window.

Although various modifications might be suggested by those versed in the art, it should be understood that I wish to embody within the scope of the patent warranted hereon all such modifications as reasonably and properly come within the scope of my contribution to the art.

I claim as my invention:

1. A device for indicating pressure above or below a preselected value comprising:

means forming a housing;

means forming a disc disposed within said housing means and having a centrally disposed, domed portion movable from a normal convex position to a concave position in response to an increase of pressure above the preselected value applied inwardly of the domed portion in the normal convex position;

means forming a translucent window overlying said disc means and having a surface disposed juxtapositionally to said disc means partially frosted to form both clear and frosted areas and having a dished configuration formed complementary to said domed position of said disc means; and means transmitting pressure to said domed portion of said disc means whereby said domed portion moves into tight engagement with said surface in response to an increase in the transmitted pressure above the preselected value to obliterate visual distinctions between said clear areas and said frosted areas, and said domed portion moves out of engagement with said surface in response to a decrease in pressure below the preselected value to render said clear areas visible to indicate a pressure below the preselected value.

2. A device for indicating pressure as defined in claim 1 and further comprising:

means forming a flexible member coextensive with said disc means and adhered to a surface of said disc juxtaposed to said dished surface of said translucent window means and movable with said domed portion into and out of engagement with said surface of said translucent window;

said flexible member having indentations formed in a surface thereof juxtaposed to said dished surface, whereby said indentations become visible whenever an increase in the transmitted pressure above the preselected value moves said domed portion to the concave position causing said flexible member to tightly engage said dished surface to indicate a pressure above the preselected value.

3. A device for indicating pressure as defined in claim 1 and further characterized by:

said housing means having a bore therethrough formed with an enlarged portion and a reduced diameter portion forming an interior, annular shoulder portion;

said disc means having a circular configuration sized to fit within said enlarged portion of said bore and including a peripheral, annular portion seated against said shoulder;

said translucent window means having a circular configuration sized to fit within said enlarged portion of said bore and including an annular peripheral portion engaged against said annular portion of said disc means on a side thereof opposite said shoulder; and means having an annular configuration and tightly engaged within said enlarged portion of said housing bore for retaining said translucent window means and said disk means within said housing.

4. In a fire extinguisher including a cylinder containing pressurized fire extinguishing material, a device for indicating the amount of pressurized fire extinguishing material contained within the cylinder comprising:

means forming a housing;

means forming a disc disposed within said housing means and having a centrally disposed, domed portion movable from a normal convex position to a concave position in response to an increase of pressure above the preselected value applied inwardly of the domed portion in the normal convex position;

means forming a translucent window overlying said disc means and having a surface disposed juxtapositionally to said disc means partially frosted to form both clear and frosted areas and having a dished configuration formed complementary to said domed portion of said disc means; and means providing fluid communication between an interior of the fire extinguisher and a side of said disc opposite of said window means to transmit pressure to said domed portion of said disc means, whereby said domed portion moves into tight engagement with said surface in response to an increase in the transmitted pressure above the preselected value to obliterate visual distinctions between said clear areas and said frosted areas, and said domed portion moves out of engagement with said surface in response to a decrease in pressure below the preselected value to render said clear areas visible to indicate an insufficient amount of fire extinguishing material contained within the cylinder to render the extinguisher operable.

5. In a fire extinguisher, a device as defined in claim 4 and further characterized by:

means forming a flexible member coextensive with said disc means and adhered to a surface of said disc juxtaposed to said dished surface of said translucent window means and movable with said domed portion into and out of engagement with said surface of said translucent window;

said flexible member having indentations formed in a surface thereof juxtaposed to said dished surface, whereby, said indentations become visible whenever an increase in pressure above the preselected value moves said domed portion to the concave position causing said flexible member to tightly engage said dished surface to indicate a sufficient amount of fire extinguishing material contained within the cylinder to render the extinguisher operable.

6. In a fire extinguisher, a device as defined in claim 4 and further characterized by:

said housing means having a bore therethrough formed with an enlarged portion and a reduced diameter portion forming an interior, annular shoulder portion;

said disc means having a circular configuration sized to fit within said enlarged portion of said bore and including a peripheral, annular portion seated against said shoulder;

said translucent window means having a circular configuration sized to fit within said enlarged portion of said bore and including an annular peripheral portion engaged against said annular portion of said disc means on a side thereof opposite said shoulder; and means having an annular configuration and tightly engaged within said enlarged portion of said housing bore for retaining said translucent window means and said disc means within said housing.

7. In a fire extinguisher, a device as defined in claim 4 and further characterized by:

the cylinder containing the pressurized fire extinguishing material having an aperture formed in a side wall thereof; and said housing means having a cylindrical portion sealingly engaged within said aperture in a manner to provide fluid communication between an interior of the cylinder and a surface of said disc opposite said translucent window.

8. In a fire extinguisher, a device as defined in claim 4 and further characterized by:

said clear areas formed on said dished surface of said translucent window means configured in the form of the word "EMPTY" when viewed from a side of the window opposite said dished surface.

9. In a fire extinguisher, a device as defined in claim 5 and further characterized by:

said indentations formed in said flexible member configured to spell the word "FULL" when viewed through said translucent window.

10. A device for indicating when the pressure in a receptacle is above or below a predetermined value comprising a housing means, a diaphragm means having first and second side surfaces, said first side surface adapted to be in pressure communication with said receptacle, said diaphragm means being movable between a first position and a second position in response to changes in pressure on said first side surface above and below said predetermined value, a translucent viewing means having an inner surface at least a portion of which is adjacent said second surface of said diaphragm means, said inner surface of said viewing means being relatively frosted except for at least one portion which is relatively clear whereby when said pressure is above said predetermined value said second surface of said diaphragm means will be in said second position in contact with said inner surface of said viewing means to obscure the differences between said relatively frosted and relatively clear portions and whereby when said pressure is below said predetermined value said diaphragm means will be in said first position with said second surface out of contact with said inner surface of said viewing means so that said relatively clear area will be readily distinguishable from said relatively frosted area.

11. A device according to claim 10 wherein said diaphragm means has indicia on said second surface thereon whereby when said diaphragm means is in said second position said indicia will be clearly visible through said viewing means but when said diaphragm is in said first position said indicia will be obscured so as not to be readily visible through said relatively frosted portion.

12. A device according to claim 11 wherein said indicia means is formed by indentations in said second surface of said diaphragm means.

13. A device according to claim 12 wherein said indentations have a bright color therein to enhance their visibility in said second position.

14. A device according to claim 12 wherein said diaphragm means includes first and second members tightly adhered to each other.

15. A device according to claim 1 wherein said clear portions of said viewing means are formed by indentations in the inner surface of said viewing means.

* * * * *